(12) United States Patent
Pawlak et al.

(10) Patent No.: US 11,768,153 B1
(45) Date of Patent: Sep. 26, 2023

(54) OPTICAL RING RESONATOR-BASED MICROFLUIDIC SENSOR

(71) Applicant: GlobalFoundries U.S. Inc., Malta, NY (US)

(72) Inventors: Bartlomiej J. Pawlak, Leuven (BE); Michal Rakowski, Ballston Lake, NY (US)

(73) Assignee: GlobalFoundries U.S. Inc., Malta, NY (US)

(*) Notice: Subject to any disclaimer, the term of this patent is extended or adjusted under 35 U.S.C. 154(b) by 0 days.

(21) Appl. No.: 17/689,120

(22) Filed: Mar. 8, 2022

(51) Int. Cl.
*G01N 21/31* (2006.01)
*G02B 6/293* (2006.01)

(52) U.S. Cl.
CPC .......... *G01N 21/31* (2013.01); *G02B 6/2935* (2013.01); *G02B 6/29343* (2013.01)

(58) Field of Classification Search
None
See application file for complete search history.

(56) References Cited

U.S. PATENT DOCUMENTS

| | | |
|---|---|---|
| 8,940,569 B2 | 1/2015 | Bedell et al. |
| 9,068,935 B2 | 6/2015 | Dorman et al. |
| 9,945,807 B2 | 4/2018 | Baghbani-Parizi et al. |
| 9,976,982 B2 | 5/2018 | Cheng et al. |
| 10,168,478 B2 | 1/2019 | Babakhani et al. |
| 11,016,055 B2 | 5/2021 | Campanella-Pineda et al. |
| 2002/0177175 A1 | 11/2002 | Hefti et al. |
| 2005/0035278 A1* | 2/2005 | Margalit ............ G01N 21/7746 250/227.14 |
| 2012/0092650 A1* | 4/2012 | Gunn, III ............... G01N 21/39 356/402 |
| 2014/0003761 A1* | 1/2014 | Dong .................... G02F 1/2257 385/2 |
| 2014/0106494 A1 | 4/2014 | Bedell et al. |

(Continued)

OTHER PUBLICATIONS

Xu, D-X., et al. "Label-free biosensor array based on silicon-on-insulator ring resonators addressed using a WDM approach." Optics letters 35.16 (2010): 2771-2773 (Year: 2010).*

(Continued)

*Primary Examiner* — Tarifur R Chowdhury
*Assistant Examiner* — Roberto Fabian, Jr.
(74) *Attorney, Agent, or Firm* — Francois Pagette; Hoffman Warnick LLC (57) ABSTRACT

Disclosed is a structure (e.g., a lab-on-chip structure) including a substrate, an insulator layer on the substrate, and at least one optical ring resonator. Each ring resonator includes cladding material on the insulator layer and, embedded within the cladding material, a first waveguide core with an input and an output, and second waveguide core(s) (e.g., ring waveguide core(s)) positioned laterally adjacent to the first waveguide core. A reservoir is below the ring resonator within the insulator layer and substrate such that surfaces of the waveguide cores are exposed within the reservoir. During a sensing operation, the waveguide core surfaces contact with fluid within the reservoir and a light signal at the output of the first waveguide core is monitored (e.g., by a sensing circuit, which in some embodiments is also coupled to a reference optical ring resonator) and used, for example, for spectrum-based target identification and, optionally, characterization.

20 Claims, 7 Drawing Sheets

(56) References Cited

U.S. PATENT DOCUMENTS

| | | | |
|---|---|---|---|
| 2014/0268165 A1* | 9/2014 | Suh | G01N 21/77 356/450 |
| 2018/0083098 A1 | 3/2018 | Goktepeli | |
| 2020/0144369 A1 | 5/2020 | Lin et al. | |

OTHER PUBLICATIONS

Taniguchi, T. et al. "Differential Si ring-resonator biosensors robust to process variations." 11th International Conference on Group IV Photonics (GFP). IEEE, 2014 (Year: 2014).*

Carlborg, C. F., et al. "A packaged optical slot-waveguide ring resonator sensor array for multiplex label-free assays in labs-on-chips." Lab on a Chip 10.3 (2010): 281-290 (Year: 2010).*

Iqbal, M. et al. "Label-free biosensor arrays based on silicon ring resonators and high-speed optical scanning instrumentation." IEEE Journal of selected topics in quantum electronics 16.3 (2010): 654-661 (Year: 2010).*

Bogaerts et al., "Silicon Microring Resonators," Laser & Photonics Reviews, 6, No. 1, 2012, pp. 47-73.

Dumon et al., "WDM filters in Silicon-on-Insulator Photonic Wires," Research Gate, 2004, pp. 1-2.

Henriksson et al., "An Approach to Ring Resonator Biosensing Assisted by Dielectrophoresis: Design, Simulation and Fabrication," Micromachines, 11, 954,2020, pp. 1-16.

Steglich et al., "Optical Biosensors Based on Silicon-On-Insulator Ring Resonators: A Review," Molecules, 24, 519, 2019, pp. 1-16.

Flueckiger et al., "Sub-Wavelength Grating for Enhanced Ring Resonator Biosensor," Optics Express, vol. 24, No. 14, 2016, pp. 1-15.

Lo et al., Photonic Crystal Microring Resonator for Label-Free Biosensing, Optics Express, vol. 25, No. 6, 2017, pp. 1-9.

Reinecke et al., "Biosensor Based on a Split-Ring Resonator," AMA Conferences—Sensor and IRS, 2017, pp. 78-83.

Sarkaleh et al., "Optical Ring Resonators: A Platform for Biological Sensing Applications," Journal of Medical Signals & Sensors, Published by Wolters Kluwer—Medknow, 2017, pp. 185-191.

Wang et al., "Silicon Coupled-Resonator Optical-Waveguide-Based Biosensors Using Light-Scattering Pattern Recognition with Pixelized Mode-Field-Intensity Distributions," Scientific Reports, vol. 4, 2014, pp. 1-9.

Belaroussi et al., "RF and Non-Linearity Characterization of Porous Silicon Layer for RF-ICs," IEEE, 2014, pp. 1-5.

Chen et al., "40 GHz RF Biosensor Based on Microwave Coplanar Waveguide Transmission Line for Cancer Cells (HepG2) Dielectric Characterization," Biosensors and Bioelectronics, vol. 61, 2014, pp. 417-421.

Van Dorst et al., "Integration of an Optical CMOS Sensor with a Microfluidic Channel Allows a Sensitive Readout for Biological Assays in Point-of-Care Tests," Biosensors and Bioelectronics, vol. 78, 2016, pp. 126-131.

Esfeh et al., Low-Cost Wideband Double-Layer Microstrip Coupled-Line Directional Coupler with High Directivity, Microwave and Optical Technology Letters, vol. 56, No. 7, 2014, pp. 1570-1575.

Esfeh et al., "RF Non-Linearities from Si-Based Substrates," IEEE, 2014, pp. 1-3.

Huang et al., "Lab-on-CMOS Integration of Microfluidics and Electrochemical Sensors," Lab Chip, 13(19), 2013, pp. 1-14.

Jeon et al., "Buried Air Gap Structure for Improving the Breakdown Voltage of SOI Power MOSFETs," IEEE, Proceedings IPEMC 2000. Third International Power Electronics and Motion Control Conference (IEEE Cat. No. 00EX435), 2000, pp. 1061-1063.

Duan et al., "Functionalized Polyelectrolytes Assembling on Nano-BioFETs for Biosensing Applications," Advanced Functional Materials, vol. 25, 2015, pp. 2279-2286.

Huang et al., "Electrochemical Processes and Mechanistic Aspects of Field-Effect Sensors for Biomolecules," J Mater Chem C Mater Opt Electron Devices, vol. 3(25), 2015, pp. 1-58.

Lee et al., "Device Considerations for Development of Conductance-Based Biosensors," Journal of Applied Physics, vol. 105, 102046, 2009, pp. 1-13.

Reiner-Rozman et al., "Graphene-Based Liquid-Gated Field Effect Transistor for Biosensing: Theory and Experiments," Biosens Bioelectron, 70: 21-27, 2015, pp. 1-16.

Sung et al., "A Review of BioFET's Basic Principles and Materials for Biomedical Applications," Korean Society of Medical and Biological Engineering, 2021, pp. 1-12.

Windbacher et al., "Simulation of Field-Effect Biosensors (BioIETs) for Biotin-Streptavidin Complexes," American Institute of Physics, 2009, pp. 1-3.

* cited by examiner

OPTICAL RING RESONATOR-BASED MICROFLUIDIC SENSOR

BACKGROUND

Field of the Invention

The present invention relates to optical devices and, more particularly, to embodiments of an optical device-based fluid sensor.

Description of Related Art

Lab-on-chip (LOC) structures typically include sensors, such as field effect transistor (FET)-based sensors with fluid-containing gate structures (e.g., biosensor FETs (bioFETs), ion-sensitive FETs (ISFETs), or the like). Such sensors can be employed, for example, to detect a target (e.g., an analyte, component, or chemical species) in a fluid and, optionally, to characterize the target (e.g., measure the concentration of the target in the fluid). There is, however, a need in the art for sensors, such as biosensors, with improved sensitivity.

SUMMARY

In view of the foregoing, disclosed herein are embodiments of a semiconductor structure (e.g., a lab-on-chip structure), which employs optical ring resonator-based microfluidic sensing and spectrum-based specifies identification and, optionally, characterization for improved sensitivity. Specifically, embodiments of the semiconductor structure can include a substrate, an insulator layer on the substrate, and at least one optical ring resonator. Each optical ring resonator can include cladding material on the insulator layer and, embedded within the cladding material, a first waveguide core with an input and an output, and second waveguide core(s) (e.g., ring waveguide core(s)) positioned laterally adjacent to the first waveguide core. A reservoir can be aligned below the optical ring resonator within the insulator layer and substrate such that surfaces of the waveguide cores are exposed within the reservoir. During a sensing operation, the waveguide core surfaces contact fluid within the reservoir and a light signal passing through the first waveguide core to the output can be monitored (e.g., by a sensing circuit, which in some embodiments is also coupled to a reference optical ring resonator) and used, for example, for spectrum-based target identification (e.g., analyte, component or chemical species identification) and, optionally, characterization.

Disclosed herein are embodiments of a semiconductor structure (e.g., a lab-on-chip structure). The structure can include a substrate and an insulator layer on the substrate. The structure can further include an optical ring resonator. The optical ring resonator can include cladding material on the insulator layer. The optical ring resonator can further include, embedded within the cladding material, a first waveguide core; and one or more second waveguide cores with a closed curve shape (e.g., one or more ring waveguide cores) positioned laterally adjacent to the first waveguide core. The structure can also include a reservoir for containing fluid during a sensing operation. This reservoir can specifically be in the substrate and further extending through the insulator layer to the cladding material and aligned below the optical ring resonator such that surfaces of the first waveguide core and the second waveguide core(s) are exposed within the reservoir. As discussed further in the detailed description section, in some embodiments, the structure can also include a reference optical ring resonator above the insulator layer and does not have surfaces exposed within the reservoir.

Some embodiments of the semiconductor structure (e.g., the lab-on-chip structure) disclosed herein can include multiple optical ring resonators. Specifically, the structure can include a substrate and an insulator layer on the substrate. The structure can further include two or more optical ring resonators. Each optical ring resonator can include cladding material on the insulator layer and, embedded within the cladding material, a first waveguide core and one or more second waveguide cores with a closed curve shape (e.g., one or more ring waveguide cores) positioned laterally adjacent to the first waveguide core. The structure can also include a reservoir for containing fluid during a sensing operation. In this case the reservoir can include multiple channels in the substrate and further extending through the insulator layer to the cladding material. Each channel can be aligned below a corresponding one of the optical ring resonators such that surfaces of the first waveguide core and the second waveguide core(s) are exposed within that channel. As discussed further in the detailed description section, in some embodiments, the structure can also include reference optical ring resonators for the optical ring resonators, respectively, where each reference optical ring resonator is above the insulator layer and does not have surfaces exposed within the reservoir.

Any of the above-mentioned embodiments can further include an additional substrate bonded to the backside of the substrate in order to increase the side of the reservoir and, thereby the fluid capacity of the lab-on-chip structure. For example, some embodiments of the semiconductor structure (e.g., the lab-on-chip structure) can include a substrate with a first surface (e.g., a backside or bottom surface) and a second surface (e.g., a frontside or top surface) opposite the second surface. The structure can further include an additional substrate bonded to the first surface and an insulator layer on the second surface. The structure can further include an optical ring resonator. The optical ring resonator can include cladding material on the insulator layer. The optical ring resonator can further include, embedded within the cladding material, a first waveguide core; and one or more second waveguide cores with a closed curve shape (e.g., one or more ring waveguide cores) positioned laterally adjacent to the first waveguide core. The structure can also include a reservoir for containing fluid during a sensing operation. This reservoir can specifically be in the additional substrate and further extending through the substrate and the insulator layer to the cladding material and aligned below the optical ring resonator such that surfaces of the first waveguide core and the second waveguide core(s) are exposed within the reservoir.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

As mentioned above, lab-on-chip (LOC) structures typically include sensors, such as field effect transistor (FET)-based sensors with fluid-containing gate structures (e.g., biosensor FETs (bioFETs), ion-sensitive FETs (ISFETs), or the like). Such sensors can be employed, for example, to detect a target (e.g., an analyte, component, or chemical species) in a fluid and, optionally, to characterize the target (e.g., measure the concentration of the target in the fluid). There is, however, a need in the art for sensors, such as biosensors, with improved sensitivity.

In view of the foregoing, disclosed herein are embodiments of a semiconductor structure (e.g., a lab-on-chip structure), which employs optical ring resonator-based microfluidic sensing and spectrum-based specifies identification and, optionally, characterization for improved sensitivity. Specifically, embodiments of the semiconductor structure can include a substrate, an insulator layer on the substrate, and at least one optical ring resonator. Each optical ring resonator can include cladding material on the insulator layer and, embedded within the cladding material, a first waveguide core with an input and an output, and second waveguide core(s) (e.g., ring waveguide core(s)) positioned laterally adjacent to the first waveguide core. A reservoir can be aligned below the optical ring resonator within the insulator layer and substrate such that surfaces of the waveguide cores are exposed within the reservoir. During a sensing operation, the waveguide core surfaces contact fluid within the reservoir and a light signal passing through the first waveguide core to the output can be monitored (e.g., by a sensing circuit, which in some embodiments is also coupled to a reference optical ring resonator) and used, for example, for spectrum-based target identification (e.g., analyte, component or chemical species identification) and, optionally, characterization.

FIGS. 1A-1B, 2A-2B, 3A-3B, and 4A-4B are layout and cross-section diagrams of various embodiments of a semiconductor structure 100, 200, 300, and 400, respectively (e.g., a lab-on-chip structure).

The semiconductor structure 100, 200, 300, 400 can include a semiconductor substrate 101, 201, 301, 401. The semiconductor substrate 101, 201, 301, 401 can be, for example, a monocrystalline silicon substrate or any other suitable semiconductor substrate. The semiconductor substrate 101, 201, 301, 401 can have a first surface (also referred to herein as a back side or bottom surface) and a second surface (also referred to herein as a front side or top surface) opposite the first surface. The semiconductor substrate 101, 201, 301, 401 can have a thickness of 300-950 µm.

The semiconductor structure 100, 200, 300, 400 can further include an insulator layer 102, 202, 302, 402 above and immediately adjacent to the second surface of the semiconductor substrate 101, 201, 301, 401. The insulator layer 102, 202, 302, 402 can be, for example, a silicon dioxide layer (also referred to herein as a buried oxide layer) or some other suitable insulator layer. The insulator layer 102, 202, 302, 402 can have a thickness of 0.3-4 µm (e.g., 2 µm).

The semiconductor structure 100, 200, 300, 400 can further include at least one fluid-sensing optical ring resonator. Specifically, in some embodiments, the semiconductor structure can include a single fluid-sensing optical ring resonator (e.g., see the single fluid-sensing optical ring resonator 120 of the semiconductor structure 100 of FIGS. 1A-1B, see also the single fluid-sensing optical ring resonator 120 of the semiconductor structure 300 of FIGS. 3A-3B). In other embodiments, the semiconductor structure can include multiple fluid-sensing optical ring resonators (e.g., see the fluid-sensing optical ring resonators 220.1-220.3 of the semiconductor structure 200 of FIGS. 2A-2B, see the fluid-sensing optical ring resonators 420.1-420.3 of the semiconductor structure 400 of FIGS. 4A-4B). It should be noted that, for purposes of illustration, three fluid-sensing optical ring resonators are shown in FIGS. 2A-2B and 4A-4B. However, these figures are not intended to be limiting. Alternatively, such structures could include any number of two or more fluid-sensing optical ring resonators.

Those skilled in the art will recognize that an optical ring resonator is a photonics device that includes multiple optical waveguides. An optical waveguide is a physical structure that guides optical signal propagation. Such an optical waveguide can include a waveguide core (also referred to as a transmission medium), which is patterned in an elongated shape with an input end and an output end or, alternatively, in a closed curve shape and which is surrounded by cladding material. The waveguide core and the waveguide cladding are made of different materials and, specifically, the core material will have a larger refractive index than the cladding material. Generally, the function of the waveguide cladding material is to confine optical signals within the waveguide core by reflection at the interfaces between the core and cladding materials in order to facilitate optical signal propagation through the waveguide core. Confinement of optical signals within the waveguide core is established as a function of the refractive index contrast between the core and cladding materials. Specifically, the higher the refractive index contrast between the core and cladding materials, the greater the confinement, and vice versa. Additionally, the shape and position of the area through which light signals are propagated within the waveguide core (referred to herein as the optical mode) is established as a function of the dimensions of the waveguide core (including the width, the height, patterned shape, etc.) and/or by the refractive index of the core material. Thus, the optical mode is typically steered (i.e., selectively adjusted or shifted) by adjusting the dimensions of the waveguide core and/or by changing the core material so it has a different refractive index.

Those skilled in the art will also recognize that an optical ring resonator includes multiple optical waveguide cores surrounded by cladding material. The optical waveguide cores include a bus waveguide core (i.e., a waveguide core with discrete ends including an input end and an output end) and one or more closed-curve waveguide cores (i.e., waveguide core(s) with a complete loop or ring shape having no discrete ends), which is/are spatially separated from but optically coupled to the bus waveguide core. Light signals can enter the bus waveguide core at the input end. Due to optical coupling, some light signals will pass into the closed-curve waveguide core(s) from the bus waveguide core and some light signals will pass from the closed-curve waveguide core(s) into the bus waveguide core. Light signals will also exit the bus waveguide core at the output end. However, within each closed-curve waveguide core, light signals of a specific resonance wavelength will make repeated roundtrips through the closed-curve waveguide core, building up intensity, due, for example, to constructive interference. The specific resonance wavelength depends upon the refractive index contrast between the core and the materials that surround the core. As a result, the light signals that pass from that closed-curve waveguide core into the bus waveguide will, predominantly, have the specific resonance wavelength.

In the disclosed embodiments, each fluid-sensing optical ring resonator 120, 220.1-220.3, 320, 420.1-420.3 is above the level of the top surface of the insulator layer 102, 202, 302, 402 (i.e., opposite the substrate 101, 201, 301, 401) and includes a first waveguide core 121, 221, 321, 421 (e.g., a bus waveguide core with discrete ends including an input end and an output end) and, one or more second waveguide cores 122, 222, 322, 422 (i.e., closed-curve waveguide cores patterned in a complete loop or ring shape with no discrete ends) positioned laterally adjacent to one or both sides of the first waveguide core 121, 221, 321, 421 and spatially separated from but optically coupled thereto.

The waveguide cores 121-122, 221-222, 321-322, 421-422 can, for example, be made of silicon, silicon nitride, or some other suitable waveguide core material. As discussed in greater detail below, in embodiments with multiple optical ring resonators (e.g., see the fluid-sensing optical ring resonators 220.1-220.3 of the semiconductor structure 200 of FIGS. 2A-2B, see the fluid-sensing optical ring resonators 420.1-420.3 of the semiconductor structure 400 of FIGS. 4A-4B), the waveguide cores of all of the optical ring resonators can be made of the same waveguide core material (e.g., all silicon, all silicon nitride, etc.) or the waveguide cores of different optical ring resonators can be made of different waveguide core materials (e.g., one or more of the optical ring resonators can have silicon waveguide cores and one or more of the optical ring resonators can have silicon germanium waveguide cores).

The waveguide cores can further be embedded in cladding material 125, 225, 325, 425 on the top surface of the insulator layer 102, 202, 302, 402. That is, as illustrated, the top and side surfaces of each of the waveguide cores 121-122, 221-222, 321-322, 421-422 can be covered by one or more layers of cladding material 125, 225, 325, 425. As mentioned above, in optical waveguides, the waveguide core material should have a larger refractive index than the cladding material. The following is a list of exemplary cladding materials that could be employed, depending upon the core material (and refractive index (n) thereof):

(1) $HfO_2$ (Hafnium dioxide), n=2.0754@1.31 um, n=2.0709@1.55 um;

(2) $ZrO_2$ (Zirconium dioxide, Zirconia), n=2.1155@1.31 um, n=2.1103@1.55 um;

(3) $Si_3N_4$, n=~2;

(4) SiON, n=~1.46 to ~2.1;

(5) AlN (Aluminum nitride), n=~2.1 to ~2.4;

(6) $TiO_2$ (Titanium dioxide), n=2.4622@1.31 um, n=2.4538@1.55 um;

(7) ZnO (Zinc monoxide), n=1.9318@1.31 um, n=1.9267@1.55 um;

(8) $Al_2O_3$ (Aluminum oxide), n=1.7503@1.31 um, n=1.7462@1.55 um;

(9) MgO (Magnesium oxide), n=1.7178@1.31 um, n=1.7146@1.55 um;

(10) $SiO_2$ (Silicon dioxide), n<1.6, n=1.45@1.31 um;

(11) $CaF_2$ (Calcium fluoride), n=1.4272@1.31 um, n=1.4260@1.55 um;

(12) OMCTS (SiCOH) n=1.406@1.31 um; and (13) $MgF_2$ (Magnesium fluoride), n=1.3718@1.31 um, n=1.3705@1.55 um.

Thus, if the waveguide cores 121-122, 221-222, 321-322, 421-422 are made of a silicon nitride (e.g., a silicon and nitrogen-containing compound, such as $Si_3N_4$) with a refractive index of 2.0, then the cladding material 125, 225, 325, 425 could be any of (7)-(13). If the waveguide cores 121-122, 221-222, 321-322, 421-422 are made of silicon with a refractive index of 3 or larger, then the cladding material 125, 225, 325, 425 could be any of (1)-(13). It should be noted that an insulator layer 102, 202, 302, 402 of silicon dioxide suitable for functioning as cladding material for either a silicon nitride or silicon waveguide core. However, instead of being completely surrounded by cladding material (including the material of the insulator layer), in the fluid-sensing optical ring resonator(s) 120, 220.1-220.3, 320, 420.1-420.3 of the disclosed semiconductor structure 100, 200, 300, 400, the bottom surfaces 123, 223, 323, 423 of the waveguide cores 121-122, 221-222, 321-322, 421-422 are exposed within a reservoir 130, 230, 330, 430 (e.g., a microfluidic reservoir), which is configured to receive a fluid 131, 231, 331, 431 (e.g., a biofluid or some other fluid requiring testing) during a sensing operation.

Specifically, in the semiconductor structure 100 of FIGS. 1A-1B and 300 of FIGS. 3A-3B, the reservoir 130, 230 can be aligned below and immediately adjacent to the single fluid-sensing optical ring resonator 120, 320. For example, the reservoir 130, 330 can extend from the first surface (also referred to herein as the back side or bottom surface) of the substrate 101, 301 to the second surface (also referred to herein as the front side or top surface) and further through the insulator layer 102, 302 to the cladding material 125, 325 such that the bottom surfaces 123, 323 of the first waveguide core 121, 321 and each second waveguide core 122, 322 are exposed within the reservoir 130, 330. The opening to the reservoir 130, 330 at the first surface of the substrate 101, 301 can be capped (e.g., see reservoir cap 132, 332) and fluid inlet/outlet ports (not shown) in the reservoir cap 132, 332 can be used to fill the reservoir 130, 330 with fluid 131, 331.

In the semiconductor structure 200 of FIGS. 2A-2B and 400 of FIGS. 4A-4B, the reservoir 230, 430 can include multiple channels 230.1-230.3, 430.1-430.3 (e.g., microfluidic channels) aligned below and immediately adjacent to the various fluid-sensing optical ring resonators 220.1-220.3, 420.1-420.3. For example, the reservoir 230, 430 can include interconnected channels. Each channel can be aligned below a corresponding one of the optical ring resonators and can extend from the first surface (also referred to herein as the back side or bottom surface) of the substrate 201, 401 to the second surface (also referred to herein as the front side or top surface) and further through the insulator layer 202, 402 to the cladding material 225, 425 such that the bottom surfaces 123, 423 of the first waveguide core 221, 421 and each second waveguide core 222, 422 of the corresponding optical ring resonator are exposed within that channel. The opening to the reservoir 230, 430 (including to each channel) at the first surface of the substrate 201,

401 can be capped (e.g., see reservoir cap 232, 432) and fluid inlet/outlet ports (not shown) in the reservoir cap 232, 432 can be used to fill the reservoir 230, 430 (including each channel) with fluid 231, 431.

During a sensing operation, a fluid 131, 231, 331, 431 (e.g., a biofluid or other fluid) can be allowed to flow into and fill the reservoir 130, 230, 330, 430 and channels thereof (if applicable) through fluid inlet/outlet ports (not shown) (e.g., in reservoir caps 132, 232, 332, 432 on the back side of the substrate, in the side of the substrate, etc.). The reservoir and channels thereof (if applicable) described above can be configured so that (e.g., when filled) the fluid 131, 231, 331, 431 will be immediately adjacent to and cover the bottom surfaces 123, 223, 323, 423 of the waveguide cores. Also, during the sensing operation, input light signals can be applied to the input of the first waveguide core 121, 221, 321, 421. Due to optical coupling, some light signals will pass into the second waveguide core(s) 122, 222, 322, 422 from the first waveguide core 121, 221, 321, 421 and some light signals will pass from the second waveguide core(s) 122, 222, 322, 422 into the first waveguide core 121, 221, 321, 421. Light signals will also exit the first waveguide core 121, 221, 321, 421 at the output. Within each second waveguide core 122, 222, 322, 422, light signals of a specific resonance wavelength will make repeated roundtrips therethrough, building up intensity, due, for example, to constructive interference. As a result, the light signals that pass from the second waveguide core 122, 222, 322, 422 into the first waveguide core 121, 221, 321, 421 will, predominantly, have that specific resonance wavelength. However, since the specific resonance wavelength will vary depending upon the refractive indices of the materials immediately adjacent to the surfaces (i.e., top, bottom, sides, etc.) of the waveguide cores, the properties of the output light signals can vary as a function of the composition of the fluid 131, 231, 331, 431 (which as mentioned above is adjacent to the bottom surfaces of the waveguide cores).

Thus, the semiconductor structure 100, 200, 300, 400 can further include photosensor(s) or photosensing circuit(s) coupled to the fluid-sensing optical ring resonator(s), respectively, and configured to capture the output light signals from the fluid-sensing optical ring resonator(s) in order to make determinations regarding the composition of the fluid 131, 231, 331, 431. For example, the output light signals can be employed to detect at least one target (e.g., an analyte, component, or chemical species) in the fluid and, optionally, to characterize the fluid (e.g., to measure the concentration of a target in the fluid, to distinguish between targets in the fluid, etc.). Thus, the disclosed embodiments can be employed for spectrum-based target identification and, optionally, characterization.

More specifically, in some embodiments (e.g., see the semiconductor structure 100 of FIGS. 1A-1B, see also the semiconductor structure 200 of FIGS. 2A-2B), the output of the first waveguide core 121, 221 of the optical ring resonator(s) 120, 220.1-220.3 can be coupled to photosensor(s) 163, 263.1-263.3. Each photosensor 163, 263.1-263.3 can be, for example, a photodiode. Those skilled in the art will recognize that a photodiode is a PN junction that converts light (photons) to current. The output current increases linearly with increases in optical power of the received light signal until the saturation current is met. The materials used for a photodiode (e.g., silicon, germanium, etc.) can be varied in order to vary sensitivity, wavelength range, etc. The current output from such a photosensor can be used to determine (e.g., closely estimate) the actual resonance frequency of the optical ring resonator. During a sense operation, when the bottom surfaces 123, 223 of the waveguide cores 121-122, 221-222 of a given optical ring resonator are exposed to a fluid 131, 231 under test, a noted shift in the actual resonance frequency from a nominal resonance frequency can indicate detection of at least one target (e.g., an analyte, component, or chemical species) in the fluid 131, 231 and, optionally, the size of this shift (e.g., as indicated by the amount of output current) can further be used to characterize the fluid (e.g., to measure the concentration of a particular target in the fluid, distinguish between specific targets in the fluid, etc.).

In other embodiments, the semiconductor structure 300, 400 can also employ reference optical ring resonator(s) 350, 450.1-450.3 associated with the fluid-sensing optical ring resonator(s) 320, 420.1-420.3, respectively, along with photosensing circuitry 360, 460.1-460.3 for improved sensitivity. Specifically, in these embodiments, each fluid-sensing optical ring resonator 320, 420.1-420.3 can be associated with a corresponding reference optical ring resonator 350, 450.1-450.1. The reference optical ring resonator can be essentially identical to the fluid-sensing optical ring resonator (e.g., in terms of waveguide core sizes, shapes, numbers, placement relative to each other, materials, etc.) except that the reference optical ring resonator is entirely above and immediately adjacent to the top surface of the insulator layer 320, 420 and, thus, has no surfaces exposed to the fluid 331, 431 within the reservoir 330, 430. That is, each reference optical ring resonator 350, 450.1-450.3 is above and immediately adjacent to the top surface of the insulator layer 302, 402 (i.e., opposite the substrate 301, 401) and includes an additional first waveguide core 351, 451 (e.g., a bus waveguide core) and, one or more second additional second waveguide cores 352, 452 (i.e., closed-curve waveguide cores patterned in a complete loop or ring shape with no discrete ends) positioned laterally adjacent to one or both sides of the additional first waveguide core 351, 451 and spatially separated from but optically coupled thereto. For each fluid-sensing optical ring resonator/reference optical ring resonator pair (320/350 in FIGS. 3A-3B or 420.1/450.1, 420.2/450.2, 420.3/450.3 in FIGS. 4A-4B), a shared input can be connected to the first waveguide core 321, 421 and to the additional first waveguide core 351, 451 by a corresponding optical signal splitter 359, 450.1-459.3; however, the first waveguide core 321, 421 and the additional first waveguide core 351, 451 can have discrete outputs.

A corresponding photosensing circuit 360, 460.1-460.2 can be coupled to the outputs of the first waveguide core 321, 421 and the additional first waveguide core 351, 451 of a given fluid-sensing optical ring resonator/reference optical ring resonator pair (320/350 in FIGS. 3A-3B or 420.1/450.1, 420.2/450.2, 420.3/450.3 in FIGS. 4A-4B) so that, during a sensing operation, output optical signals are received from the fluid-sensing optical ring resonator of the given pair and reference optical signals are received from the reference optical ring resonator of the given pair. Specifically, the photosensing circuit 360, 460.1-460.3 can include an interferometer 361, 461.1-461.3, an optical signal combiner 362, 462.1-462.2, and a photosensor 363, 463-1-463.3 (e.g., a photodiode, as discussed above). The interferometer 361, 461.1-461.3 can have inputs coupled to the output of the first waveguide core of the fluid-sensing optical ring resonator of a given pair and to the output of the additional first waveguide core of the reference optical ring resonator of the given pair. The interferometer 361, 461.1-461.3 can be, for example, a Mach-Zehnder interferometer. The Mach-Zehnder interferometer can be configured to receive fluid-sensing output optical signals from the first waveguide core and reference output optical signals from the additional first waveguide core. The Mach-Zehnder interferometer can further be configured to phase shift one set of output signals (e.g., the reference output optical signals) by 180 degrees. Finally, the Mach-Zehnder interferometer can further be configured to output the two sets of output optical signals (including the fluid-sensing output optical signals and the phase-shifted reference output optical signals) to the combiner 362, 462.1-462.3. The combiner 362, 462.1-462.3 can be configured to combine the two sets of output optical signals and to apply the combined output optical signals to input of the photosensor 363, 463.1-463.3.

During a sensing operation, if no resonance frequency shift occurs in the fluid-sensing optical ring resonator of the given pair due to exposure of the bottom surfaces of the waveguide cores 321-322, 421-422 to the fluid 331, 431, then the fluid-sensing output optical signals and the phase-shifted reference output optical signals will cancel each other out when combined by the combiner and the photosensor will not detect any light (e.g., no current will be output from the photodiode). However, during the sensing operation, if a resonance frequency shift does occur in the fluid-sensing optical ring resonator of the given pair due to exposure of the bottom surfaces of the waveguide cores 321-322, 421-422 to the fluid 331, 431, then that shift will be relatively easy to detect because the fluid-sensing output optical signals and the phase-shifted reference output optical signals will not cancel each other out when combined by the combiner. Thus, the photosensor will detect light and, as a result, output current. The output of current from the photosensor can, for example, be indicative of detection of at least one target (e.g., an analyte, component, or chemical species) in the fluid 331, 431. Furthermore, the amount of current can be measured and indicative of the size of the shift in the actual resonance frequency from a nominal resonance frequency and, thereby can be used to further characterize the fluid (e.g., to measure the concentration of a particular target in the fluid, distinguish between specific targets in the fluid, etc.).

It should be noted that, in some embodiments, the bottom surfaces 123, 223, 323, 423 of the waveguide cores 121-122, 221-222, 321-322, 421-422 of each fluid-sensing optical ring resonator 120, 220.1-220.3, 320, 420.1-420.3 within a reservoir 130, 230, 330, 430 can be uncoated. In other embodiments, the bottom surfaces 123, 223, 323, 423 of the waveguide cores 121-122, 221-222, 321-322, 421-422 of each fluid-sensing optical ring resonator 120, 220.1-220.3, 320, 420.1-420.3 within a reservoir 130, 230, 330, 430 can be "functionalized" surfaces. That is, the bottom surfaces 123, 223, 323, 423 can be processed so that that they contain specific receptors for a target analyte in the fluid 131, 231, 331, 431. For example, in the case of a biosensor, the receptors can be specific bioreceptors for a target bioanalyte. In this case, during a sensing operation, any of the target analytes within the fluid can bind to the receptors on the bottom surfaces of the waveguide cores so that the bottom surfaces of the waveguide cores may be covered by bonded receptor-analyte pairs, thereby shifting the resonance frequency of the fluid-sensing optical ring resonator. In this case, the resonance frequency of the fluid-sensing optical ring resonator can be highly sensitive to the target analyte.

Figure 4A:
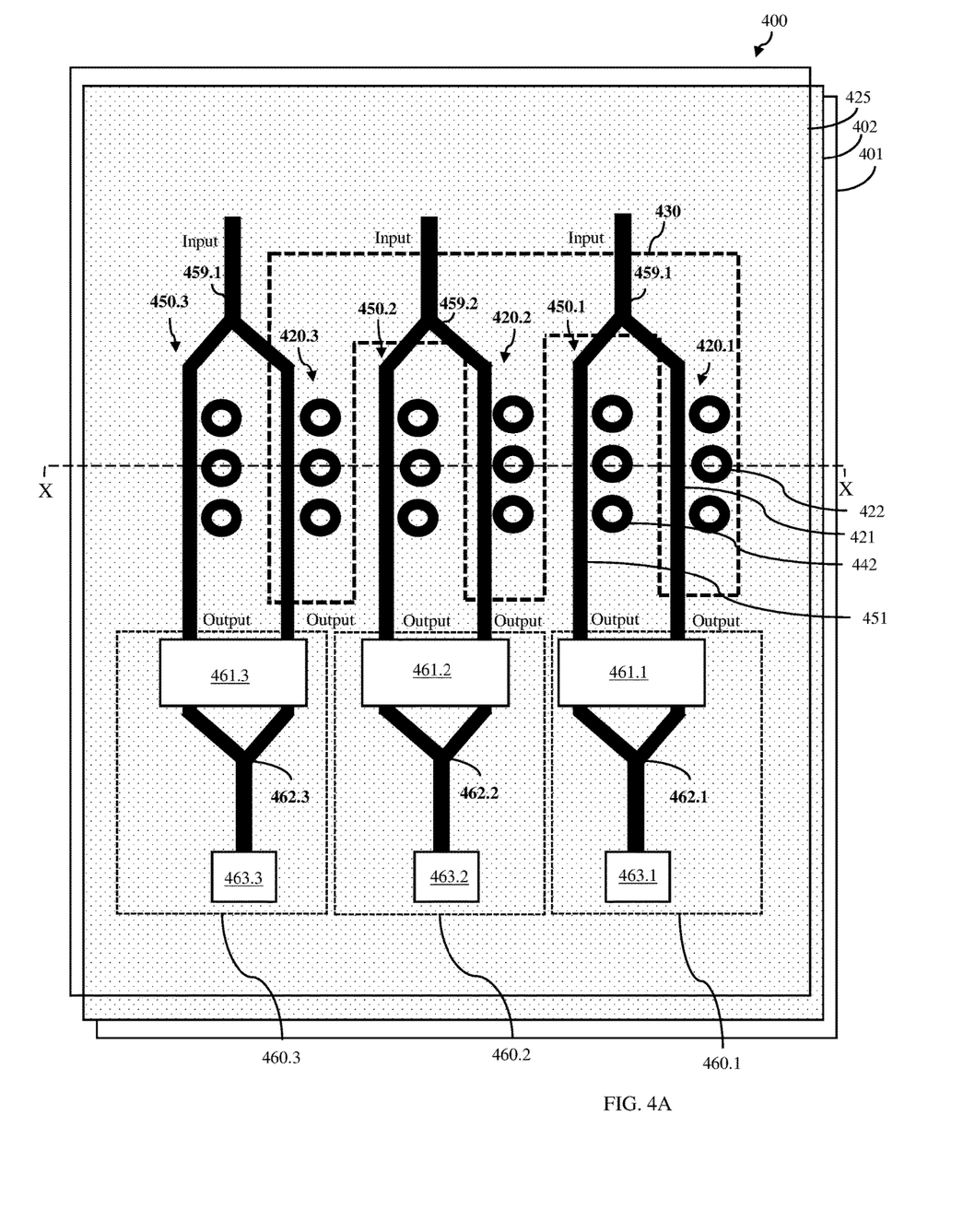
FIGS. 4A-4B are layout and cross-section diagrams, respectively, illustrating yet another disclosed semiconductor structure including multiple optical ring resonator and corresponding reference optical ring resonators configured for microfluidic sensing.
Figure 4B:
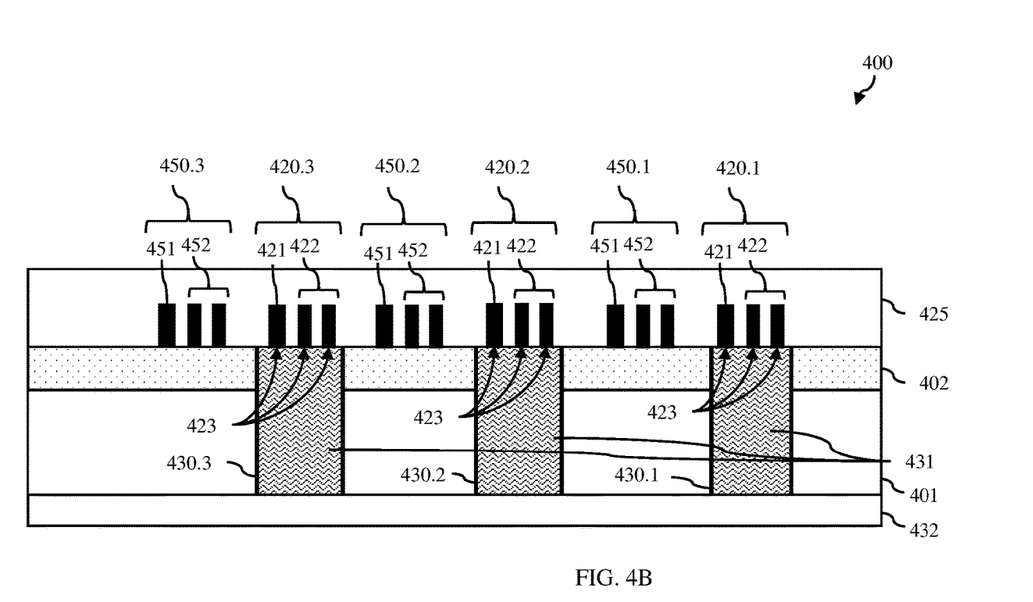

As mentioned above, the semiconductor structure 200 of FIGS. 2A-2B and the semiconductor structure 400 of FIGS. 4A-4B each include multiple fluid-sensing optical ring resonators 230.1-230.3, 430.1-430.3 coupled directly or indirectly to corresponding photosensors 263.1-263.3, 463.1-463.3. In these embodiments, the fluid-sensing optical ring resonators 230.1-230.3, 430.1-430.3 and photosensors 263.1-263.3, 463.1-463.3 can be essentially identical and employed for replicate sensing of the same sample of fluid. Alternatively, two or more of the fluid-sensing optical ring resonators 230.1-230.3, 430.1-430.3 and/or the photosensors 263.1-263.3, 463.1-463.1 can be different for concurrent but different testing of the same sample of fluid. For example, two or more of the fluid-sensing optical ring resonators could have different waveguide core sizes, different numbers of second waveguide cores, different waveguide core materials, different waveguide core shapes, etc. and/or the photosensors could be made of different materials in order to achieve different sensitivities to the same target, optimal sensitivities for different targets, etc.

Figure 5A:
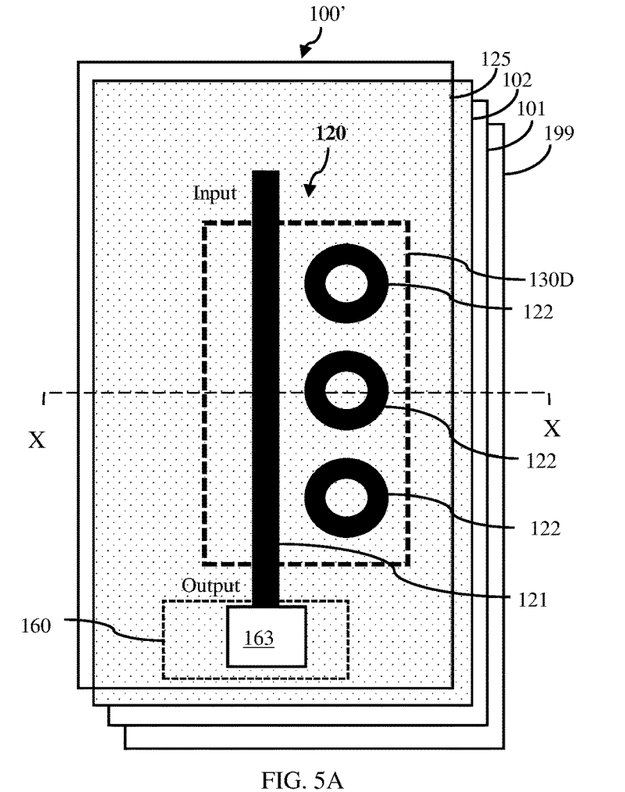
FIGS. 5A-5B are layout and cross-section diagrams, respectively, illustrating an optional back-side bonded additional substrate, which is shown on the structure of FIGS. 1A-1B and which could be employed with any of the other structures disclosed herein to facilitate increasing reservoir capacity.
Figure 5B:
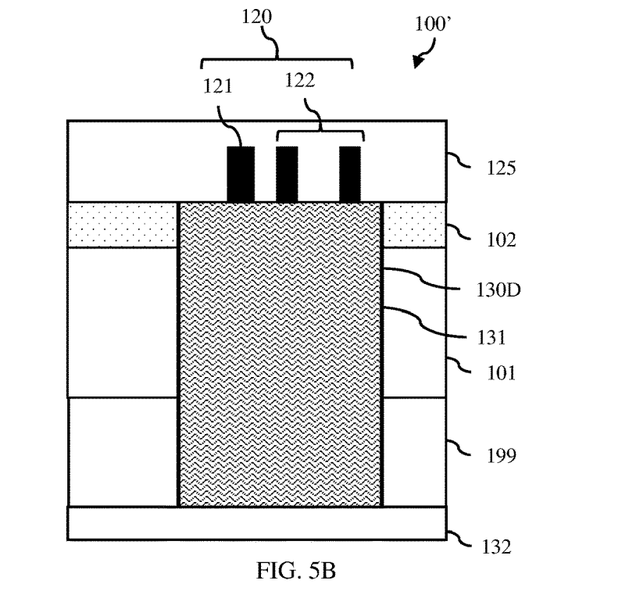

In each of the semiconductor structure embodiments described above and illustrated in FIGS. 1A-1B, 2A-2B, 3A-3B and 4A-4B, the fluid-containing capacity of the reservoir 130, 230, 330, 430 is limited by the combined thicknesses of the semiconductor substrate 101, 201, 301, 401 and the insulator layer 102, 202, 302, 402. However, it should be understood that the fluid-containing capacity of the reservoir 130, 230, 330, 430 can, optionally, be increased by bonding an additional semiconductor substrate to the first surface (also referred to herein as the back side or bottom surface) of the semiconductor substrate. For example, FIGS. 5A-5B are layout and cross-section diagrams of illustrating an alternative semiconductor structure 100' including an optional additional semiconductor substrate 199 bonded to the first surface of the semiconductor substrate 101 and a large capacity reservoir 130D. Specifically, the semiconductor structure 100' is essentially the same as the semiconductor structure 100 of FIGS. 1A-1B except that it includes an additional semiconductor substrate 199 (e.g., an optional additional silicon substrate) bonded to the first surface of the semiconductor substrate 101. The additional semiconductor substrate 199 can, like the semiconductor substrate 101, have a thickness of 300-950 µm. In this case, a relatively deep reservoir 130D (i.e., a large capacity reservoir) can extend through the additional semiconductor substrate 199, through the semiconductor substrate 101, and further through the insulator layer 102 to the cladding material 125 such that the bottom surfaces 123 of the waveguide cores 121-122 of the fluid-sensing optical ring resonator 120 are exposed within the reservoir 130D. The opening to the reservoir 130D at the back side of the additional substrate (i.e., opposite the back side of the substrate 101) can be capped with the reservoir cap 132 and, as discussed above, fluid inlet/outlet ports (not shown) can be used to fill the reservoir 130D with the fluid 131 during a sensing operation. It should be understood that, while FIGS. 5A-5B illustrate modification of the semiconductor structure 100 of FIGS. 1A-1B to include the additional semiconductor substrate and the large capacity reservoir, similar modifications can also be made to the semiconductor structure 200 of FIGS. 2A-2B, 300 of FIGS. 3A-3B and 400 of FIGS. 4A-4B.

Figure 1A:
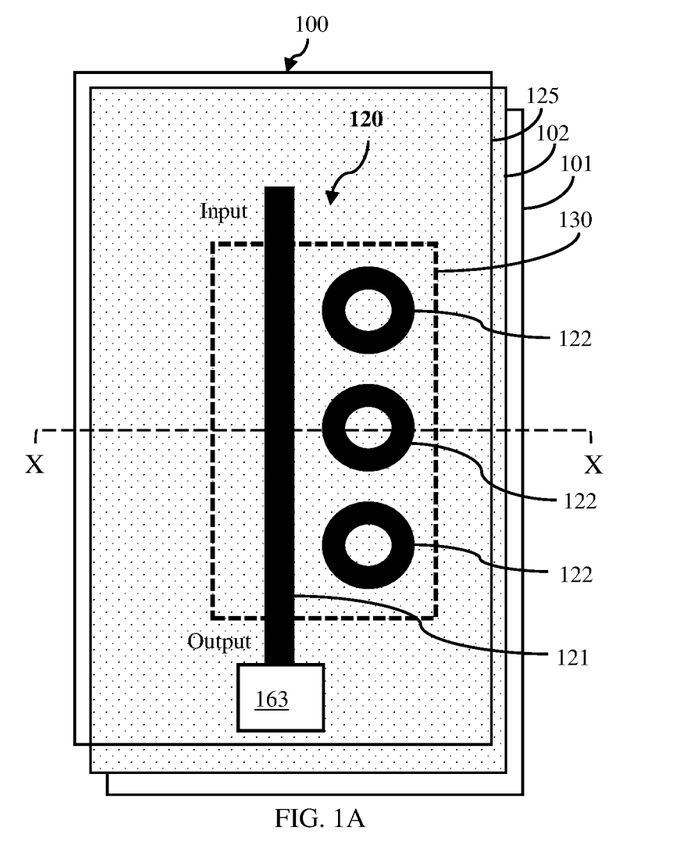
FIGS. 1A-1B are layout and cross-section diagrams, respectively, illustrating a disclosed semiconductor structure including an optical ring resonator configured for microfluidic sensing.
Figure 1B:
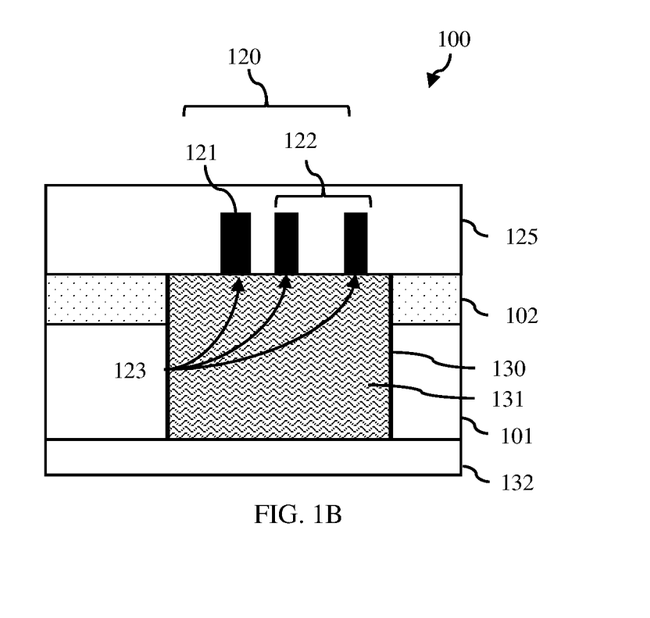
Figure 2A:
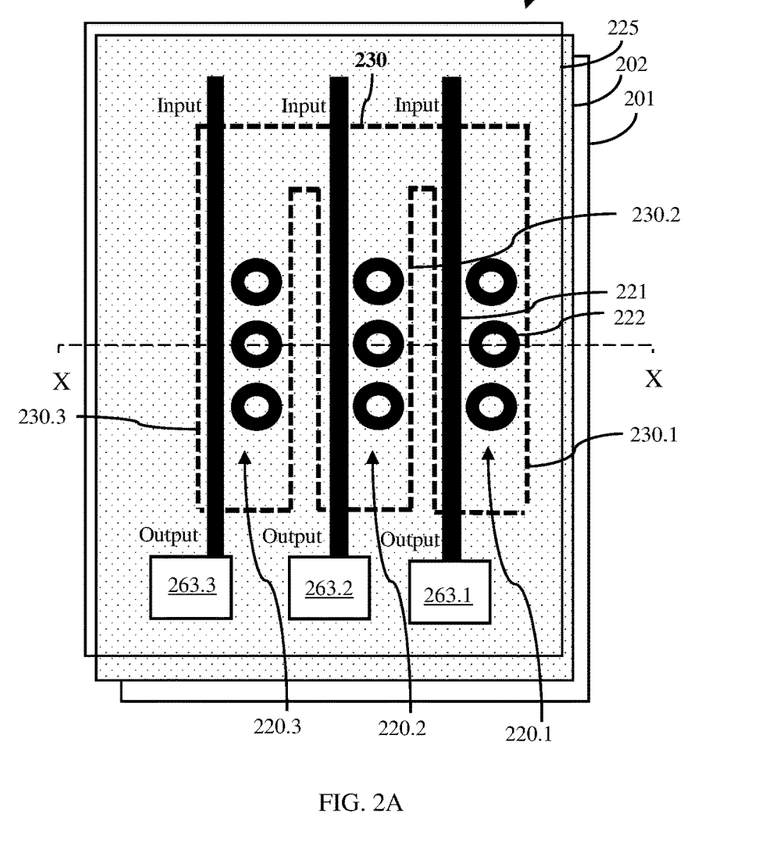
FIGS. 2A-2B are layout and cross-section diagrams, respectively, illustrating another disclosed semiconductor structure including multiple optical ring resonators configured for microfluidic sensing.
Figure 2B:
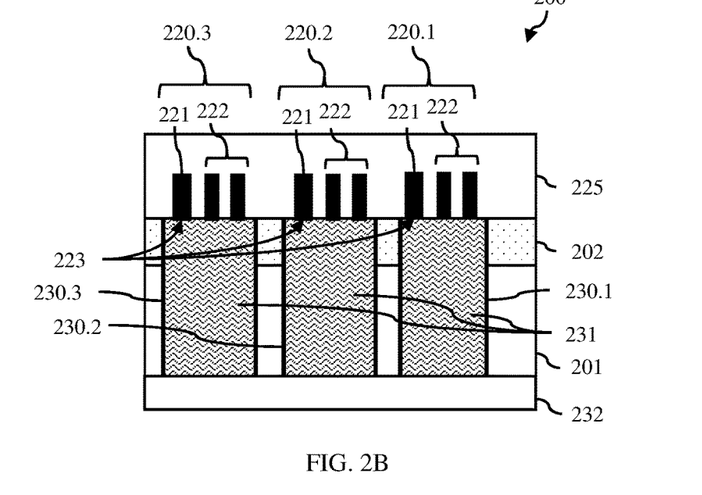
Figure 3A:
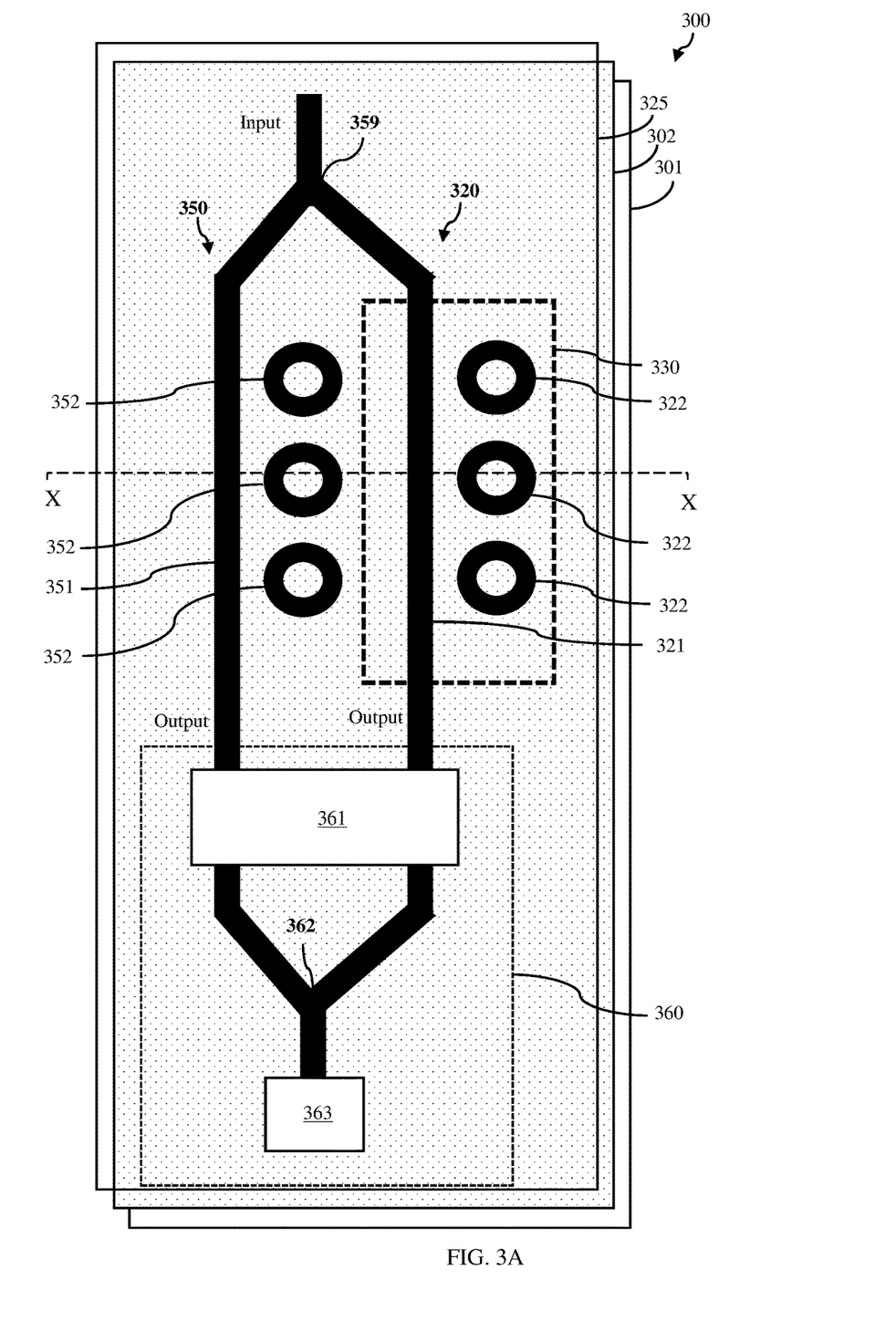
FIGS. 3A-3B are layout and cross-section diagrams, respectively, illustrating yet another disclosed semiconductor structure including an optical ring resonator and corresponding reference optical ring resonator configured for microfluidic sensing.
Figure 3B:
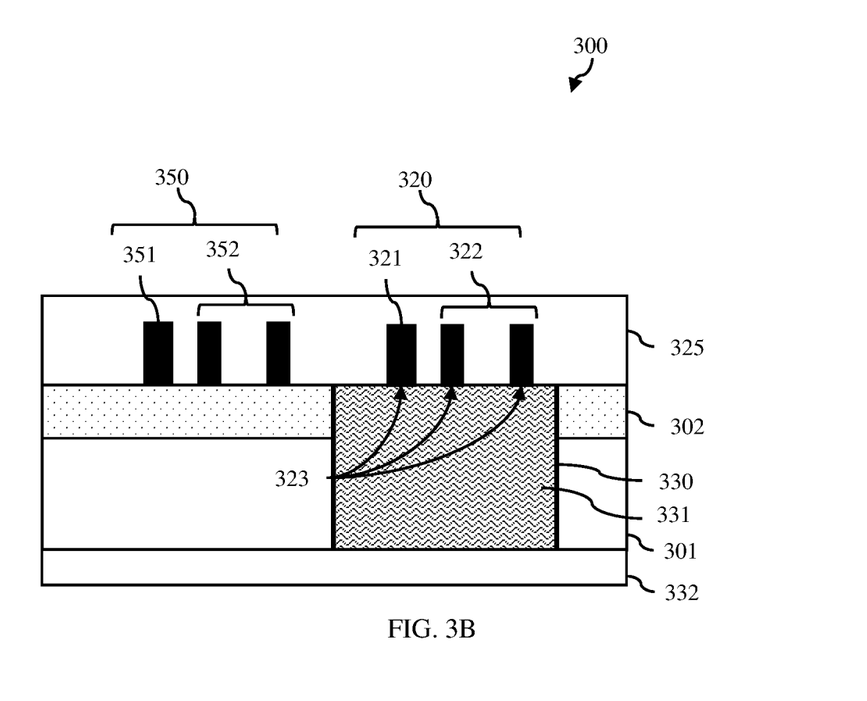

Also disclosed herein are method embodiments for forming the above-described semiconductor structures 100 of FIGS. 1A-1B (or 100' of FIGS. 5A-5B), 200 of FIGS. 2A-2B, 300 of FIGS. 3A-3B and 400 of FIGS. 4A-4B. Formation of these semiconductor structures can for example begin with a semiconductor-on-insulator structure (e.g., a silicon-on-insulator (SOI) structure. This semiconductor-on-insulator structure can include a semiconductor substrate (e.g., a silicon substrate) with a first surface (e.g., a bottom surface or back side) and a second surface (e.g., a top surface or front side) opposite the first surface. This semiconductor-on-insulator structure can further include an insulator layer (e.g., a silicon dioxide layer or some other suitable insulator layer) on the second surface of the semiconductor substrate and a semiconductor layer (e.g., a silicon layer) on the insulator layer. Optionally, an additional semiconductor substrate (e.g., an additional silicon substrate) can be bonded to the first surface of the semiconductor substrate. Front end of the line (FEOL) processing can be performed in order to form the fluid-sensing optical ring resonator(s), reference ring resonator(s) (if applicable), photosensor(s), etc. on the insulator layer. Middle of the line (MOL) and back end of the line (BEOL) processing can subsequent be performed. Following BEOL processing, the reservoir (including any channels, if applicable) can be lithographically patterned and etched through the additional semiconductor substrate (if applicable), through the semiconductor substrate, and through the insulator layer. In embodiments having a single fluid-sensing optical ring resonator, the reservoir can be patterned so as to be aligned directly that fluid-sensing optical ring resonator. In embodiments having multiple fluid-sensing optical ring resonators, the reservoir can be patterned so as to have corresponding channels aligned directly below the fluid-sensing optical ring resonators, respectively. The opening to the reservoir at either the back side of the semiconductor substrate or the backside of the additional semiconductor substrate (if applicable) can be capped with a reservoir cap and fluid inlet/outlet ports (not shown) can be formed in reservoir cap to enable filling of the reservoir with a fluid during a sensing operation.

It should be understood that in the embodiments described above, a semiconductor material refers to a material whose conducting properties can be altered by doping with an impurity. Exemplary semiconductor materials include, for example, silicon-based semiconductor materials (e.g., silicon, silicon germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used. For example, a silicon-based semiconductor material (e.g., silicon, silicon germanium, etc.) is typically doped with a Group III dopant, such as boron (B) or indium (In), to achieve P-type conductivity, whereas a silicon-based semiconductor material is typically doped a Group V dopant, such as arsenic (As), phosphorous (P) or antimony (Sb), to achieve N-type conductivity. A gallium nitride (GaN)-based semiconductor material is typically doped with magnesium (Mg) to achieve P-type conductivity and with silicon (Si) or oxygen to achieve N-type conductivity. Those skilled in the art will also recognize that different conductivity levels will depend upon the relative concentration levels of the dopant(s) in a given semiconductor region.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was

What is claimed is:

1. A structure comprising:
   a substrate having a first surface and a second surface opposite the first surface, wherein the substrate is a semiconductor substrate;
   an insulator layer immediately adjacent to the second surface of the substrate;
   an optical ring resonator comprising:
      cladding material on the insulator layer;
      a first waveguide core; and
      at least one second waveguide core, wherein the at least one second waveguide core has a closed curve shape and is positioned laterally adjacent to the first waveguide core, wherein the first waveguide core and the at least one second waveguide core have bottom surfaces adjacent to the insulator layer, top surfaces opposite the bottom surfaces, and side surfaces, and wherein the top surfaces and the side surfaces are covered by the cladding material; and
   a reservoir extending through the substrate from the first surface to the second surface and further through the insulator layer to the cladding material, wherein the bottom surfaces of the first waveguide core and the at least one second waveguide core are at least partially exposed within the reservoir.

2. The structure of claim 1, wherein the reservoir is configured to hold a fluid adjacent to the surfaces and wherein the structure further includes a reservoir cap layer immediately adjacent to the first surface of the substrate extending over the reservoir.

3. The structure of claim 1, wherein the first waveguide core and the at least one second waveguide core comprise any of silicon and silicon nitride.

4. The structure of claim 1, wherein the first waveguide core has an input and an output.

5. The structure of claim 4, further comprising a photosensor coupled to the output to detect a shift in resonance frequency of the optical ring resonator.

6. The structure of claim 1, further comprising:
   a reference optical ring resonator on the insulator layer and comprising:
      an additional first waveguide core; and
      at least one additional second waveguide core, wherein the at least one additional second waveguide core has a closed curve shape and is positioned laterally adjacent to the additional first waveguide core, wherein the first waveguide core and the at least one additional second waveguide core are embedded in the cladding material, and wherein the first waveguide core and the additional first waveguide core are connected to a shared input by a splitter and have discrete outputs; and
   a photosensing circuit coupled to the outputs.

7. The structure of claim 6, wherein the photosensing circuit comprises:
   a combiner;
   an interferometer coupled between the outputs and the combiner; and
   a photosensor coupled to the combiner.

8. The structure of claim 7, wherein the interferometer comprises Mach-Zehnder interferometer that shifts an optical signal from the additional first waveguide core by 180 degrees such that detection of any light by the photosensor is indicative of a shift in resonance frequency of the optical ring resonator.

9. The structure of claim 1, wherein the surfaces comprise functionalized surfaces.

10. A structure comprising:
    a substrate having a first surface and a second surface opposite the first surface, wherein the substrate is a semiconductor substrate;
    an insulator layer immediately adjacent to the second surface of the substrate; and
    multiple optical ring resonators, wherein each optical ring resonator comprises:
       cladding material on the insulator layer;
       a first waveguide core; and
       at least one second waveguide core, wherein the at least one second waveguide core has a closed curve shape and is positioned laterally adjacent to the first waveguide core, wherein the first waveguide core and the at least one second waveguide core have bottom surfaces adjacent to the insulator layer, top surfaces opposite the bottom surfaces, and side surfaces, and wherein the top surfaces and the side surfaces are covered by the cladding material; and
    a reservoir comprising multiple channels extending through the substrate from the first surface to the second surface and further through the insulator layer to the cladding material,
       wherein each channel is aligned with a corresponding optical ring resonator, and
       wherein the bottom surfaces of the first waveguide core and the at least one second waveguide core of the corresponding optical ring resonator are at least partially exposed within the channel.

11. The structure of claim 10, wherein the reservoir is configured to receive a fluid and wherein each channel is configured to hold the fluid immediately adjacent to the surfaces of the first waveguide core and the at least one second waveguide core of the corresponding optical ring resonator exposed within the channel.

12. The structure of claim 10, wherein, within each optical ring resonator, the first waveguide core and the at least one second waveguide core comprise any of silicon and silicon nitride.

13. The structure of claim 10, wherein the optical ring resonators are any of identical.

14. The structure of claim 10, wherein the optical ring resonators are different.

15. The structure of claim 10, further comprising photosensors coupled to outputs of first waveguide cores of the optical ring resonators, respectively, to detect shifts in resonance frequencies of the optical ring resonators.

16. The structure of claim 10, further comprising:
    multiple reference optical ring resonators on the insulator layer, wherein the reference optical ring resonators are paired with the optical ring resonators, respectively, to form optical ring resonator pairs and wherein each reference optical ring resonator in a given pair comprises:
       an additional first waveguide core; and
       at least one additional second waveguide core, wherein the at least one additional second waveguide core has a closed curve shape and is positioned laterally adjacent to the additional first waveguide core, wherein the additional first waveguide core and the at least one additional second waveguide core are embedded in the cladding material, and wherein the first waveguide core of the optical ring resonator of the given pair and the additional first waveguide core of the reference optical ring resonator of the given pair are connected to a shared input by a splitter and further have discrete outputs; and photosensing circuits coupled the optical ring resonator pairs, respectively.

17. The structure of claim 16, wherein each photosensing circuit comprises:

a combiner;

an interferometer coupled between the outputs of the given pair and the combiner; and a photosensor coupled to the combiner.

18. The structure of claim 17, wherein the interferometer comprises a Mach-Zehnder interferometer that shifts an optical signal from the additional first waveguide core of the given pair by 180 degrees such that detection of any light by the photosensor is indicative of a shift in resonance frequency of the optical ring resonator of the given pair.

19. The structure of claim 10, wherein the surfaces comprise functionalized surfaces.

20. A structure comprising:

a substrate having a first surface and a second surface opposite the first surface, wherein the substrate is a semiconductor substrate;

an additional substrate immediately adjacent to the first surface;

an insulator layer immediately adjacent to the second surface;

an optical ring resonator comprising:

cladding material on the insulator layer;

a first waveguide core; and at least one second waveguide core, wherein the at least one second waveguide core has a closed curve shape and is positioned laterally adjacent to the first waveguide core, wherein the first waveguide core and the at least second waveguide core have bottom surfaces adjacent to the insulator layer, top surfaces opposite the bottom surfaces, and side surfaces, where the top surfaces and the side surfaces are covered by the cladding material; and a reservoir extending through the additional substrate, through the substrate from the first surface to the second surface, and further through the insulator layer to the cladding material, wherein bottom surfaces of the first waveguide core and the at least one second waveguide core are exposed within the reservoir.

\* \* \* \* \*